United States Patent Office 3,194,646
Patented July 13, 1965

3,194,646
HERBICIDAL COMPOSITIONS AND METHODS
Thomas C. Nohejl, Downers Grove, Ill., assignor to Nalco Chemical Company, Chicago, Ill., a corporation of Delaware
No Drawing. Filed Jan. 29, 1962, Ser. No. 169,679
6 Claims. (Cl. 71—2.4)

The present invention relates to the control and destruction of undesirable vegetation using new herbicidal compositions. This application is a continuation in part of my copending application Serial No. 28,190 which was filed on May 11, 1960, and is in turn a continuation in part of my application Serial No. 751,127 which was filed on July 28, 1958, both now abandoned.

In recent years there have been developed several new herbicidal chemicals which give relatively complete weed control at low dosages. One of the newer classes of these efficient herbicides are the herbicidally active substituted s-triazines. These triazines are, for the most part, water-insoluble which means that when applied to the ground they remain in the upper soil level thereby affecting germinating weed seeds found in these zones. They are considered non-selective, hence they have wide application when used in such general weed control problems as are found on or near road sides, railroad rights-of-way, industrial sites, and areas adjacent to cultivated land. Testing has shown the substituted s-triazines to be effective for purposes of general weed control at dosages ranging between 2 and 50 pounds per acre with good results usually being achieved when application rates of between 5 and 20 pounds per acre are used.

While these symmetrical substituted triazines represent an advancement in the art of weed control, nevertheless, it would be advantageous if they could be improved in their herbicidal activity whereby lower application rates could be used and the length of the effective killing time could be extended.

It therefore becomes an object of the invention to provide new herbicidal compositions containing symmetrical s-triazines which are herbicidally active at relatively low dosages and possess long term residual activity. Other objects will appear hereinafter.

In accordance with the invention it has been found that new and improved herbicidal compositions may be prepared by combining a herbicidally active substituted s-triazine with an alkali metal borate compound.

The substituted triazines which possess herbicidal activity and are desirable for use with the system of this invention may be further illustrated by the following three general structural formulas:

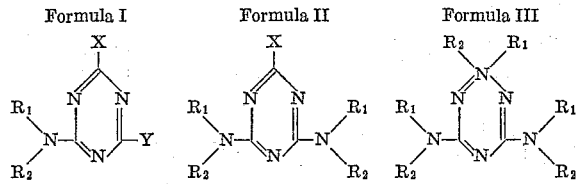

Wherein $R_1$ and $R_2$ each represent a member selected from the group consisting of hydrogen, lower alkyl, lower alkenyl, lower hydroxyalkyl, and cyclohexyl radicals and $R_1$ and $R_2$ together with corresponding nitrogen atoms constitute members selected from the group consisting of 5- to 6-membered alkylenimino radicals and the morpholino radical, and X and Y each represent a member selected from the group consisting of halogen, lower alkoxy, lower alkylmercapto, lower alkenyloxy, lower alkenylmercapto, lower nitroalkyloxy, lower haloalkoxy, lower alkoxyalkoxy, and lower hydroxyalkoxy radicals.

These substituted radicals may be obtained by reacting a cyanuric halide with such compounds as primary or secondary amines, alcohols or thiols.

The term "lower" as used to describe the above groups may be defined as an aliphatic group of from two to six carbons with the preferred materials having aliphatic groups of from two to four carbon atoms.

Examples of specific compounds illustrative of Formulae I–III are:

2-chloro-4,6-bis (ethylamino)-s-triazine;
2-methoxy-4,6-bis (ethylamino)-s-triazine;
2-chloro-4,6-bis (methylamino)-s-triazine;
2-chloro-4,6-bis(isopropylamino)-s-triazine;
2-chloro-4-ethylamino-6-diethylamino-s-triazine;
2-chloro-4-isopropylamino-6-diethylamino-s-triazine;
2-chloro-4,6-bis(diethylamino)-s-triazine;
2-chloro-4-diethylamino-6-isopropylamino-s-triazine;
2-chloro-4-ethylamino-6-isopropylamino-s-triazine;
2-chloro-4-methylamino-6-isopropylamino-s-triazine;
2-chloro-4-propylamino-6-isopropylamino-s-triazine;
2-methoxy-4,6-bis(isopropylamino)-s-triazine;
2-methoxy-4-ethylamino-6-isopropylamino-s-triazine;
2-methoxy-4-methylamino-6-isopropylamino-s-triazine.

The herbicidally active substituted s-triazines and their effectiveness as herbicides are described in detail in U.S. Patents 2,891,855 and 2,936,227, the disclosures of which are incorporated herein by reference.

The cation portion of the alkali metal borate may be selected from any alkali metal such as sodium lithium, potassium and the like. Of these, the most preferred is the sodium derivative. The boron-containing radical can be chosen from among meta and tetra borate with the latter being preferred.

In the preferred practice of the invention, sodium tetra borate known generally as borax, whether in its refined or crude state gives excellent results. It is believed that it is a matter of choice whether refined or crude borax is used. Tests which have in the past been performed on the relative toxicity of different compounds of boron indicate that it is the borate ion that produces the injury, and that the above various refined or crude borate compounds are toxic in proportion to the amount of borate they contain. Typical analyses of two particular borates are as follows:

(I) CRUDE BORAX ORE

Chemical analysis

| | Weight percent |
|---|---|
| Boric oxide ($B_2O_3$) | 34.0 |
| Sodium oxide ($Na_2O$) | 15.3 |
| Iron oxide ($Fe_2O_3$) | 0.3 |
| Aluminum oxide ($Al_2O_3$) | 0.8 |
| Titanium oxide ($TiO_2$) | 0.8 |
| Silica ($SiO_2$) | 2.8 |
| Calcium oxide (CaO) | 0.7 |
| Magnesium oxide (MgO) | 0.9 |
| Carbon dioxide | 0.6 |
| Water ($H_2O$) | 44.6 |
| Water insoluble | 6.0 |

(II) FINE GRANULATED BORAX

Chemical analysis

| | |
|---|---|
| Boron trioxide ($B_2O_3$) | 36.3–38.3 |
| Sodium oxide ($Na_2O$) | 16.2–17.1 |
| Water ($H_2O$) | 44.6–47.5 |
| Anhydrous borax ($Na_2B_4O_7$) | 52.5–55.4 |
| Equivalent borax ($Na_2B_4O_7 \cdot 10H_2O$) | 99.5–105.0 |

The herbicidally active substituted s-triazines and borate compounds are usually formulated to contain a preponderance of borate compound. Thus, 18 to 20 parts of borate compounds to one part substituted symmetrical triazine is advantageous although the ratio of substituted symmetrical s-triazine to boron compound may be at a ratio of 1:1 without departing from the scope of the invention.

A particularly preferred combination of substituted s-triazine and borate compound is shown below in Formula IV.

FORMULA IV

Ingredients: Percent by weight
- (A) 2 - chloro - 4,6-bis (ethylamino) - s-triazine _____ 2–50
- (B) Fine granulated borax _____ 50–98

Another formulation found to be very effective and useful is that shown below in Formula V.

FORMULA V

Ingredients: Percent by weight
- (A) 2-chloro-4-ethylamino - 6-isopropylamino-s-triazine _____ 2–50
- (B) Fine granulated borax _____ 50–98

The compositions of the invention give outstanding weed control when used at dosages ranging from 100 to 600 pounds per acre with optimum dosage requirements usually being within the range of 200 to 400 pounds per acre. The compounds of the invention when compared on the basis of the amount of herbicidally active substituted s-triazines they contain, are usually 10% to 20% more effective than the substituted s-triazines when used alone. They give their best results when applied prior to the active growth periods of the vegetation to be controlled.

The commercial products of the invention are desirably solid, granular, free-flowing materials although the invention may be practiced using the components in water or oil dispersions. When solid, granulated products are formulated, it is oftentimes convenient to use binders or fillers to produce a satisfactory, workable product. Minor amounts of such materials as dextrin, talc, mica, clay and diatomaceous earth may be used as fillers and binders. Where water or oil wettable products are desirable, it is helpful to blend with the active components, oil and/or water-dispersible wetting agents such as are described in the article entitled "Synthetic Detergents—Up To Date—II," by John W. McCutcheon, Soap and Sanitary Chemicals, July–October 1952.

Other ingredients such as water may be used in formulating solid products, but it will be understood that the compositions of the invention are not limited by their physical form. For purposes of illustrating typical formulas of the invention, several compositions are listed below. Also shown are several of the individual components of these formulas. The field testing which is described hereinafter will demonstrate the several advantages of the compositions of the invention over their individual components.

COMPOSITION I

Ingredients: Percent by weight
- 2-chloro-4,6-bis(ethylamino)-s-triazine _____ 1.7
- Dextrine _____ 1.7
- Fine granulated borax _____ 96.6

COMPOSITION II

Ingredients:
- 2-chloro-4,6-bis(ethylamino)-s-triazine _____ 2.9
- Dextrine _____ 1.4
- Fine granulated borax _____ 95.7

COMPOSITION III

Ingredients:
- 2-chloro-4,6-bis(ethylamino)-s-triazine _____ 6.0
- Dextrine _____ 1.5
- Fine granulated borax _____ 92.5

COMPOSITION IV

Ingredients: Percent by weight
- 2-chloro-4,6-bis(ethylamino)-s-triazine _____ 8.1
- Dextrine _____ 1.3
- Fine granulated borax _____ 90.6

COMPOSITION V

Ingredients: Fine granulated borax _____ 100

COMPOSITION VI

Ingredients:
- 2-chloro-4,6-bis(ethylamino)-s-triazine _____ 100

COMPOSITION VII

Ingredients:
- 2-chloro-4,6-bis(methylamino)-s-triazine _____ 10
- Bentonite _____ 10
- Dextrine _____ 5
- Fine granulated borax _____ 75

Evaluations of the invention

Field tests were conducted using as the test situs, weed-infested lots in the Chicago area whose vegetational growth pattern was considered as representative. Application of the treatment was made using conventional spreading equipment. The test plots were 100 square feet in area. Application was made early in the summer and the observations as to the effectiveness of the treatments were made in 90 days and one year after the application. The results of these tests are presented in Table II below:

TABLE II

| Test No. | Comp. No. | Lbs. Per Acre | Ninety Day Results | One year Results |
|---|---|---|---|---|
| 1 | VI | 10 | 90 % total kill; broad leaf regrowth. | 30% total kill; thistle blue grass and quack grass regrowth. |
| 2 | II | 300 | 50% total kill | 60% total kill: some bindweed regrowth. |
| 3 | VI | 40 | 90% total kill | 97% total kill. |
| 4 | IV | 300 | ___do___ | Do. |
| 5 | V | 1,000 | 20% total kill | Complete regrowth. |

A comparison of Tests Nos. 1 and 2 shows that the compositions of the invention, as exemplified by Composition II, to be twice as effective as the substituted triazines alone, on an approximately comparable dosage basis. Tests Nos. 3 and 4 show that smaller amounts of substituted s-triazine when used in combination with borax are equivalent in herbicidal activity to larger amounts of s-triazines used above. Test 5 shows large quantities of borax per se are ineffective as long term herbicidal agents.

The invention is claimed as follows:

1. A composition comprising (A) a herbicidally active substituted s-triazine selected from the group consisting of the formula:

Formula I  Formula II  Formula III

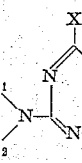

wherein $R_1$ and $R_2$ each represent a radical selected from the group consisting of hydrogen, lower alkyl, lower alkenyl, lower hydroxy alkyl, and cyclohexyl and $R_1$ and $R_2$ together with corresponding nitrogen atoms constitute a radical selected from the group consisting of 5- to 6-membered alkylenimino and morpholino, and X and Y each represent a radical selected from the group consisting of halogen, lower alkoxy, lower alkylmercapto, lower alkenyloxy, lower alkenylmercapto, lower nitroalkyloxy, lower haloalkoxy, lower alkoxyalkoxy, and lower hydroxyalkoxy and (B) an alkali metal borate compound with the weight ratio of said triazine to said borate being within the range of 1:20 to 1:1.

2. A herbicidal composition comprising:

| Ingredients: | Percent by weight |
|---|---|
| (A) 2-chloro - 4,6-bis(ethylamino)-s-triazine | 2–50 |
| (B) Borax | 50–98 |

3. The method of controlling the growth of undesirable vegetation which comprises applying to the ground on which it grows a herbicidal amount of a composition comprising (A) a herbicidally active substituted s-triazine seelcted from the group consisting of the formulas:

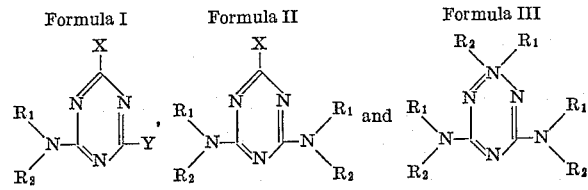

wherein $R_1$ and $R_2$ each represent a radical selected from the group consisting of hydrogen, lower alkyl, lower alkenyl, lower hydroxy alkyl, and cyclohexyl and $R_1$ and $R_2$ together with corresponding nitrogen atoms constitute a radical selected from the group consisting of 5- to 6-membered alkylenimino and morpholino, and X and Y each represent a radical selected from the group consisting of halogen, lower alkoxy, lower alkylmercapto, lower alkenyloxy, lower alkenylmercapto, lower nitroalkyloxy, lower haloalkoxy, lower alkoxyalkoxy, and lower hydroxyalkoxy and (B) an alkali metal borate compound with the weight ratio of said triazine to said borate being within the range of 1:20 to 1:1.

4. The method of claim 3 where the application is made prior to the active growth periods of the vegetation to be controlled.

5. The method of controlling the growth of undesirable vegetation which comprises applying to the ground on which it grows from 200 to 400 pounds per acre of a composition comprising:

| Ingredients: | Percent by weight |
|---|---|
| (A) 2-chloro - 4,6-bis(ethylamino)-s-triazine | 2–50 |
| (B) Borax | 50–98 |

6. The method of claim 5 where application is made prior to the active growth period of the vegetation to be controlled.

References Cited by the Examiner

UNITED STATES PATENTS

| 2,891,855 | 6/59 | Gysin et al. | 71—2.5 |
| 3,004,844 | 10/61 | Stahler et al. | 71—2.4 |
| 3,032,405 | 5/62 | Mitchell et al. | 71—2.4 X |
| 3,077,392 | 2/63 | Bales | 71—2.4 |

FOREIGN PATENTS 1,220,266  1/60  France.

JULIAN S. LEVITT, *Primary Examiner.*

MAURICE A. BRINDISI, *Examiner.*

UNITED STATES PATENT OFFICE
CERTIFICATE OF CORRECTION

Patent No. 3,194,646　　　　　　　　　　　　July 13, 1965

Thomas C. Nohejl

It is hereby certified that error appears in the above numbered patent requiring correction and that the said Letters Patent should read as corrected below.

Columns 1, 4 and 5, Formula III, each occurrence, should appear as shown below instead of as in the patent:

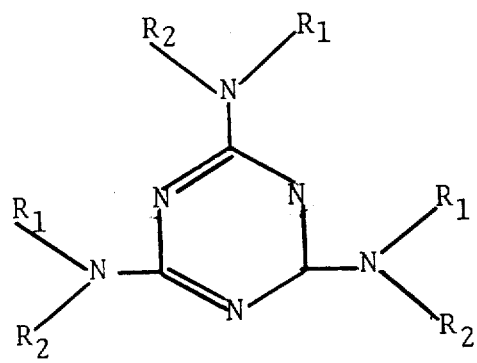

Signed and sealed this 10th day of May 1966.

(SEAL)
Attest:

ERNEST W. SWIDER　　　　　　　　　　　EDWARD J. BRENNER
Attesting Officer　　　　　　　　　　　Commissioner of Patents